(12) United States Patent
Xing et al.

(10) Patent No.: US 6,998,732 B2
(45) Date of Patent: Feb. 14, 2006

(54) POWER SYSTEM FOR SUPPLYING STABLE POWER

(75) Inventors: Yan Xing, Beijing (CN); Xiaodong Sun, Beijing (CN)

(73) Assignee: Lite-On Technology Corporation, Taipei (TW)

( * ) Notice: Subject to any disclaimer, the term of this patent is extended or adjusted under 35 U.S.C. 154(b) by 505 days.

(21) Appl. No.: 10/200,184

(22) Filed: Jul. 23, 2002

(65) Prior Publication Data

US 2004/0017113 A1    Jan. 29, 2004

(51) Int. Cl.
  *H02J 1/12* (2006.01)
(52) U.S. Cl. .......................................... 307/45; 307/103
(58) Field of Classification Search .................. 307/45, 307/103
See application file for complete search history.

(56) References Cited

U.S. PATENT DOCUMENTS

| 5,450,000 | A | * | 9/1995 | Olsen | 323/222 |
| 5,715,154 | A | * | 2/1998 | Rault | 363/89 |
| 6,178,104 | B1 | * | 1/2001 | Choi | 363/89 |
| 6,690,143 | B1 | * | 2/2004 | Lin et al. | 323/222 |

* cited by examiner

*Primary Examiner*—Stephen W. Jackson
*Assistant Examiner*—Brett Squires
(74) *Attorney, Agent, or Firm*—Birch, Stewart, Kolasch & Birch, LLP

(57) ABSTRACT

A distributed power system, wherein a backup boost transformer is connected between a PFC transformer and a FE DC transformer. The backup boost transformer is also parallel connected with a diode. The backup boost transformer only operates in the sustaining time, if the first DC voltage drops gradually, the backup boost transformer will increase this first DC voltage and stabilize it at a preset voltage of the FE DC transformer. Therefore, the capacity of the storage capacitor of the PFC transformer can be fully utilized to have a longer sustaining time and decrease the variation range of the second DC voltage so as to enhance the efficiency and power density thereof.

8 Claims, 5 Drawing Sheets

POWER SYSTEM FOR SUPPLYING STABLE POWER

BACKGROUND OF THE INVENTION

1. Field of the Invention

The present invention relates to a distributed power system and, more particularly, to a distributed power system used in a power transformer having a narrower normal direct current (DC) input range and keeping the output voltage thereof when the input voltage drops occasionally in a short time.

2. Description of the Prior Art

As shown in FIG. 1, a conventional distributed power system includes a power factor correction (PFC) transformer 1a, a front end (FE) DC transformer 2a, and a load end transformer 3a. The PFC transformer 1a is used to transform an alternating current (AC) input voltage into a high DC voltage (generally 400V), and performs the corresponding PFC in the input terminal thereof. The FE DC transformer 2a is used to transform the above high DC voltage into another DC voltage (generally 48V or 12V), and sends the DC voltage to the load end transformer 3a, which transforms the DC voltage into the required voltage for loads.

Above FE DC transformer 2a is configured to operate with a smaller duty ratio for the purpose of keeping the output voltage thereof constant during the sustaining time (e.g., 20 ms). That is, the FE DC transformer 2a still operates within the regulation range so that the storage capacitor of the PFC transformer 1a discharges to drop its output voltage from 400V to 300V.

However, with this smaller duty ratio, the efficiency and power density of the conventional distributed system and the energy use efficiency of the storage capacitor of the PFC transformer 1a are relatively lower.

As shown in FIG. 2, there is an asymmetric half bridge (AHB) circuit topology adopting an FE DC transformer with asymmetric windings. Under the normal working status, the duty cycle of the FE DC transformer 2a can be increased, and the output voltage of the FE DC transformer 2a can be kept constant when the output voltage of the PFC transformer 1a drops from 400V to 300V.

For the AHB transformer, the duty ratio thereof varies from 0 to 0.5 theoretically. The smaller the duty ratio is, the more "asymmetric" the operating status of the transformer will be, leading to the more imbalanced component stress and the lower efficiency. Therefore, the ideal operating status is with the duty ratio close to 0.5.

Under the situation of constant output voltage, the higher the input voltage of the AHB transformer, the smaller the duty cycle. Therefore, the output voltage of the AHB transformer can be kept constant without any processing during the sustaining time if the AHB transformer operates within the regulation range when the storage capacitor discharges and the output voltage of the PFC transformer 1a drops from 400V to 300V. In other words, the AHB transformer has a largest duty ratio when the input voltage is 300V. However, this will result in a very small duty ratio so that the operating efficiency of the AHB transformer under the normal operating status with an input voltage of 400V is inferior.

Moreover, the output ripple of the AHB transformer will increase, the power distribution of complementary loops is more imbalanced, and the energy usage efficiency of the storage capacitor of the PFC transformer 1a is lower.

As shown in FIG. 3, there is an asymmetric half bridge (AHB) transformer adopting an FE DC transformer with the range (adjustable) winding. A switch is used to change the range winding of the transformer so as to increase the duty ratio of the FE DC transformer 2a under the normal operating status when the input voltage drops from 400V to 300V.

However, during the sustaining time, if there is an abrupt change of the status of the AHB transformer, the output voltage thereof easily fluctuates. Moreover, the energy usage efficiency of the storage capacitor of the PFC transformer 1a is low.

Accordingly, the present invention aims to provide a distributed power system to resolve the problems in the prior art.

SUMMARY OF THE INVENTION

One object of the present invention is to provide a distributed power system, which can fully utilize the capacity of a storage capacitor of a PFC transformer to have a longer sustaining time and decrease the variation range of the input voltage of the FE DC transformer so as to improve the efficiency and power density thereof.

To achieve the above object, in the present invention, a backup boost transformer is connected between a PFC transformer and an FE DC transformer. The backup boost transformer is also parallel connected with a diode. The backup boost transformer further includes a boost transformer topology, a controller, and a hysteresis comparator. Because the backup boost transformer operates only in the sustaining time, if the output voltage of the PFC transformer drops gradually in the sustaining time, the backup boost transformer will level up this voltage and stabilize it at a preset output voltage value. Therefore, the variation range of the input voltage of the FE DC transformer is very small, and the energy of a storage capacitor of the PFC transformer can be fully utilized.

Another object of the present invention is to provide a distributed power system capable of increasing the efficiency and power density. Because the backup boost transformer operates only in the sustaining time, which is very short, thus, it can be configured to operate at high frequencies and power densities and with a very small volume. Moreover, it does operate other than the input AC voltage is normal, and thus will not dissipate any power at that point. Whenever the AC input voltage is normal, the energy of the FE DC transformer is transmitted by the diode but not by the backup boost transformer.

The various objects and advantages of the present invention will be more readily understood from the following detailed description when read in conjunction with the appended drawing, in which:

DETAILED DESCRIPTION OF THE PREFERRED EMBODIMENTS

Figure 1:
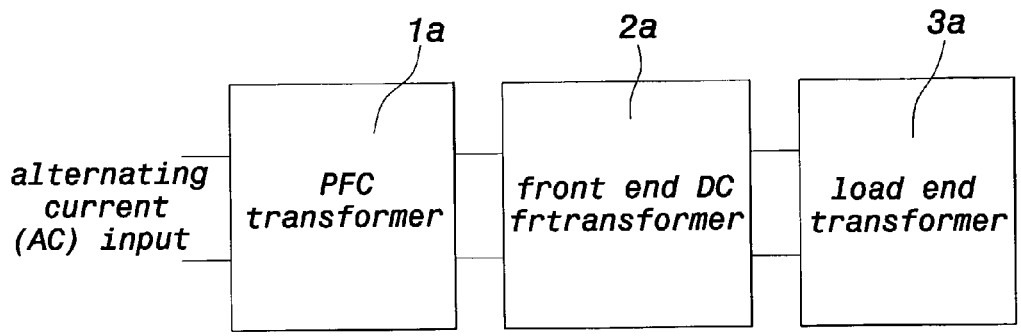
FIG. 1 is an schematic diagram of a conventional distributed power system.
Figure 2:
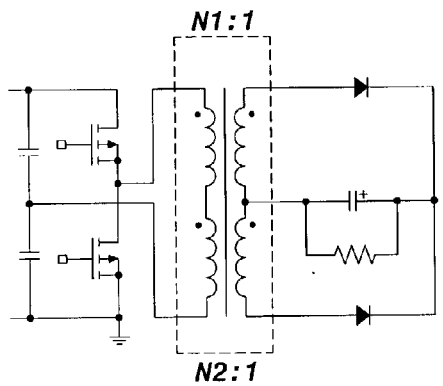
FIG. 2 is a circuit diagram of the FE DC transformer shown in FIG. 1, which adopts an AHB circuit topology.
Figure 3:
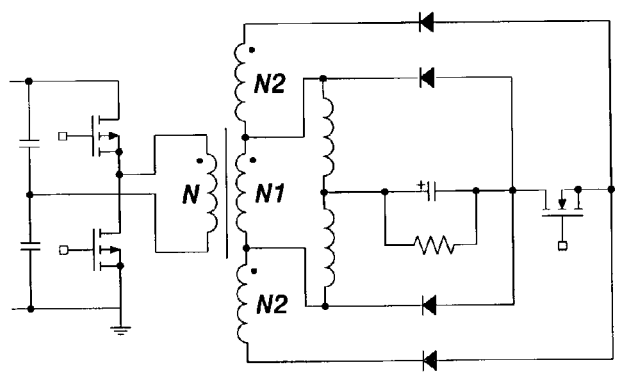
FIG. 3 is a circuit diagram of the FE DC transformer shown in FIG. 1, which adopts an AHB transformer.
Figure 4:
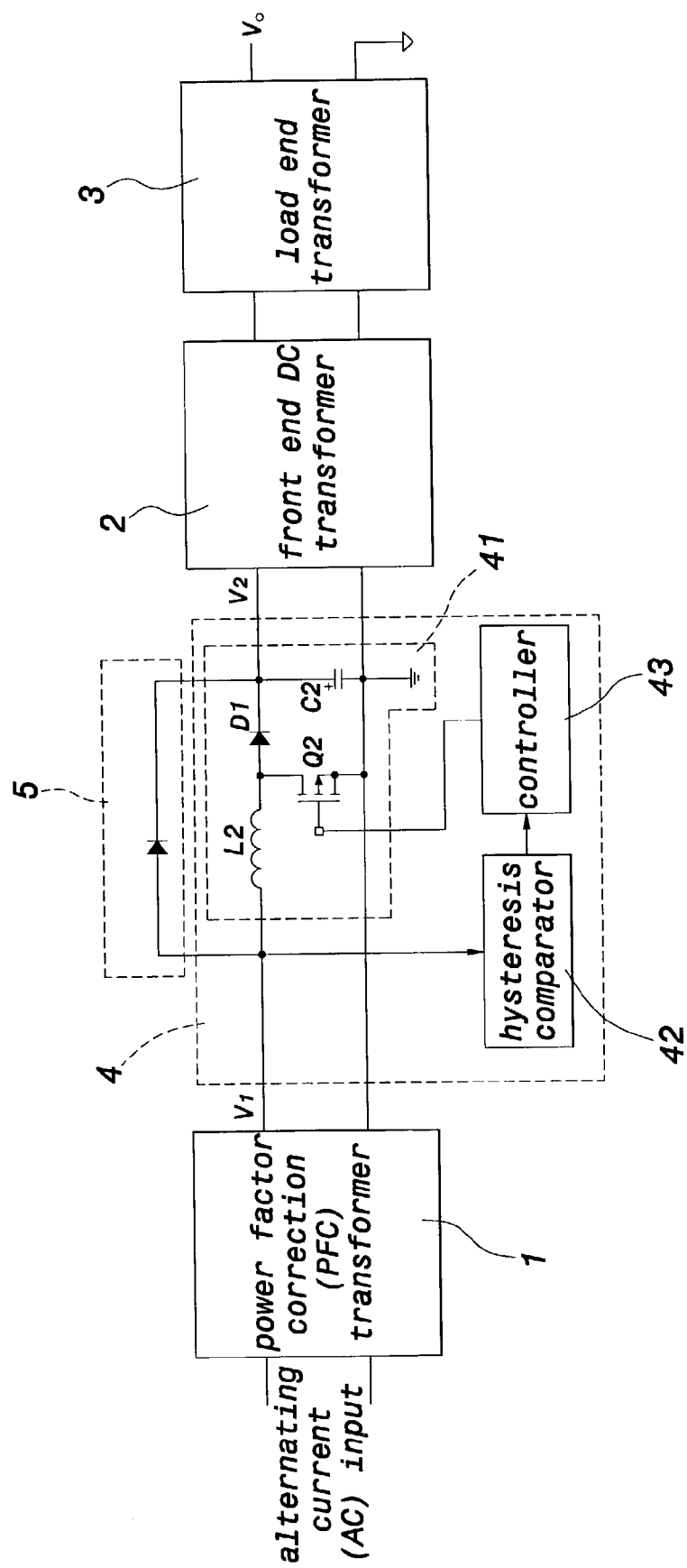
FIG. 4 is an schematic diagram of the present invention.

As shown in FIG. 4, the present invention provides a distributed power system, which can fully utilize the capacity of a storage capacitor of an PFC transformer to have a longer sustaining time and decrease the variation range of the input voltage of an FE DC transformer so as to improve the efficiency and power density thereof. In the distributed power system, a backup boost transformer 4 is connected between a PFC transformer 1 and an FE DC transformer 2 and is also parallel connected with a diode 5. The FE DC transformer 2 can be an AHB or another circuit topology. The backup boost transformer 4 sets a first preset voltage V.sub.2set to be lower than the normal output voltage V.sub.1set of the PFC transformer 1.

The backup boost transformer 4 includes a boost transformer topology 41, a hysteresis comparator 42, and a controller 43.

The boost transformer topology 41 includes a switching component Q2, an inductor L2, a diode D1, and a capacitor C2. The switching component Q2 of the present invention is a metal oxide semiconductor (MOS) having its source grounded, and the drain thereof connected to one end of the inductor L2 and one end of the diode D1. The other end of the inductor L2 is connected to the output terminal of the PFC transformer 1. The other end of the diode D1 is connected to one end of the capacitor C2 and the input terminal of the FE DC transformer 2. The other end of the capacitor C2 is grounded.

Figure 5:
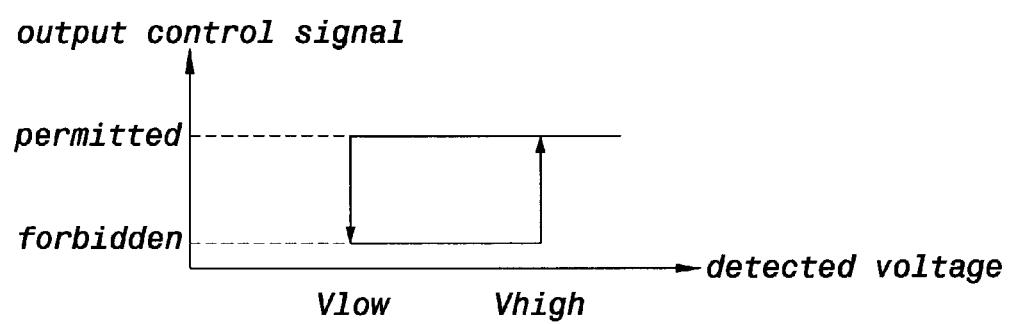
FIG. 5 is a diagram showing the relationship between input and output voltages of a hysteresis comparator of the present invention.
Figure 6:
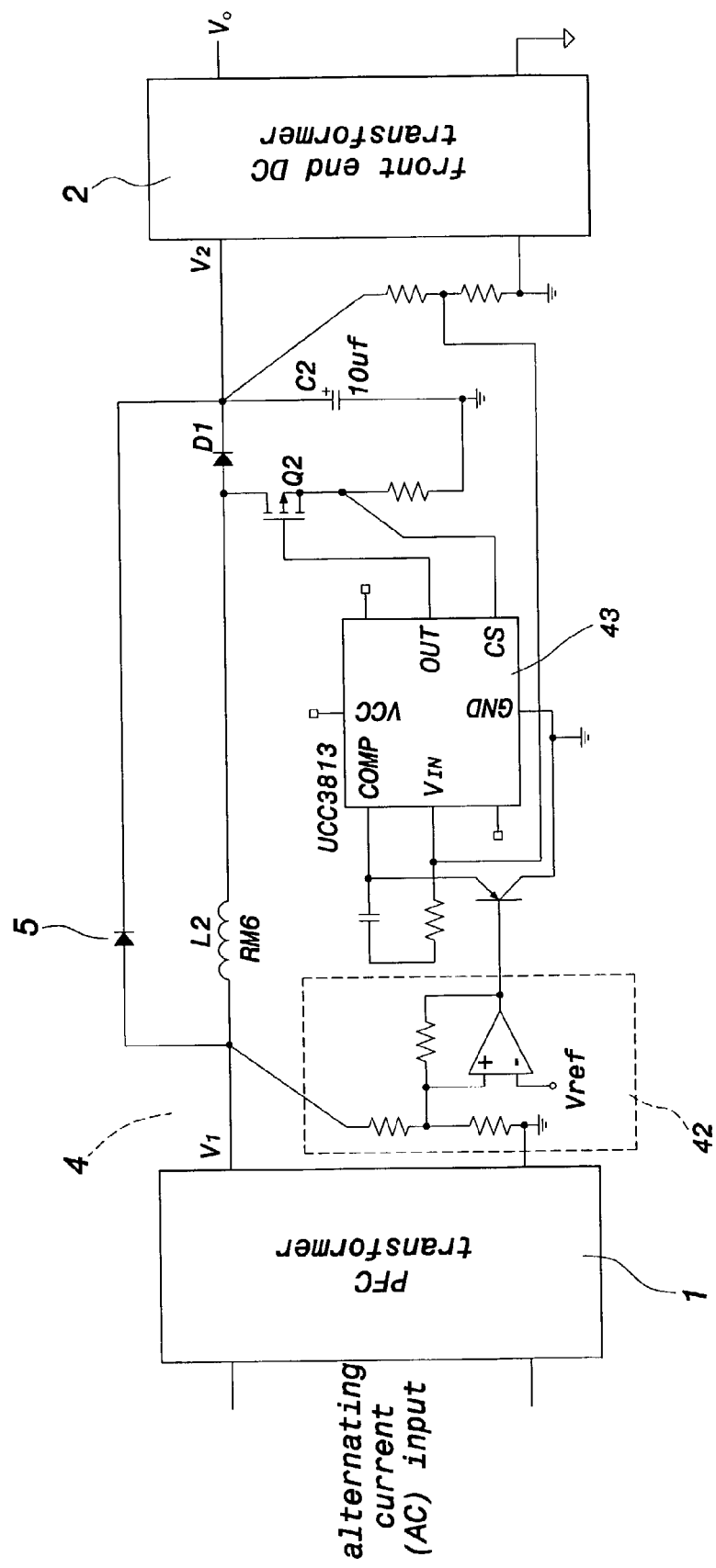
FIG. 6 is a schematic diagram of an embodiment of the present invention.

The hysteresis comparator 42 connected to the output terminal of the PFC transformer 1 includes a comparator, resistors, and a reference voltage $V_{ref}$, as shown in FIG. 6. Please refer to FIG. 5. When the PFC transformer 1 is just activated and the output voltage thereof, i.e., the first DC voltage, has not risen to a $V_{high}$ yet ($V_{high}$ is set to be a value between the second preset voltage $V_{2set}$ and the first preset voltage $V_{1set}$), the hysteresis comparator 42 will stop the backup boost transformer 4 from operation. When the first DC voltage, which is transformed by the PFC transformer 1 from the input AC voltage, $V_1$ of the PFC transformer 1 drops below $V_{low}$, the hysteresis comparator 42 will also stop the backup boost transformer 4 from operation. Components in the backup boost transformer 4 can thus be protected from the over currents. The value of $V_{low}$ depends on the characteristic of the hysteresis comparator 42.

The controller 43 is connected to the output terminal of the hysteresis comparator 42 and the gate of the switching component Q2. The controller 43 serves to control the duty ratio of the switching component Q2. When the first DC voltage $V_1$ less than the second preset voltage $V_{2set}$, the second DC voltage, i.e., the output voltage of the backup boots transformer 4, will be stabilized at the second preset voltage $V_{2set}$; when the first DC voltage $V_1$ is larger than the second preset voltage $V_{2set}$, the backup boost transformer 4 will not operate, and the diode 4 is on to transmit the power.

When the AC input voltage is normal, the first DC voltage of the PFC transformer is normal too. The backup boost transformer 4 does not operate and of course has a duty ratio equal to zero, and the diode 5 is on. Meanwhile, the input voltage of the FE DC transformer 2 is the first preset voltage $V_{1set}$.

When the AC voltage is cut off or drops substantially, a storage capacitor of the PFC transformer 1 discharges, and the first DC voltage drops to the second preset voltage $V_{2set}$. Meanwhile, the duty ratio of the backup boost transformer 4 increases from zero, the backup boost transformer 4 stabilizes the second DC voltage at the value of the second preset voltage $V_{2set}$, the diode 5 is off, and the third voltage, i.e., the output voltage of the FE DC transformer 2, is kept constant.

When the first voltage continually drops to $V_{low}$ (e.g., a half of the first preset voltage $V_{1set}$), the switching component Q2 of the backup boost transformer 4 is cut off by the hysteresis comparator 42, and the second and third DC voltage quickly drop to zero.

If the cut-off time of the AC voltage is not larger than the predetermined sustaining time, along with the restoration of the AC voltage, the first DC voltage will bounce back, and the duty ratio of the backup boost transformer 4 will decrease accordingly. When the second DC voltage is higher than the second preset voltage $V_{2set}$, the duty ratio of the backup boost transformer 4 naturally decreases to zero, the diode 5 is conducted, and the normal operating status is restored. During this process, the third DC voltage of the FE DC transformer 2 is kept constant.

Figure 7:
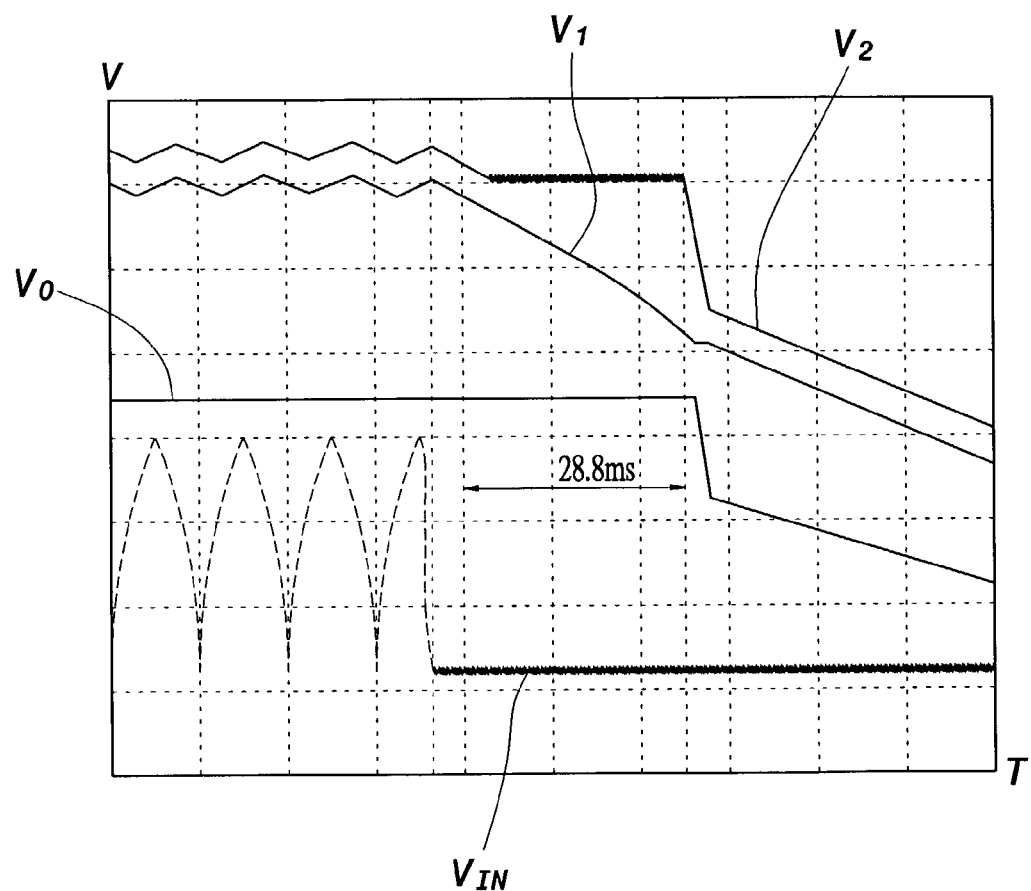
FIG. 7 is graph showing wave patterns at each measured point according to the embodiment of the present invention.

FIG. 6 shows an embodiment of the present invention, wherein the storage capacitor in the PFC transformer 1 is 440 micro farads, the first preset voltage is set to be 400V, the FE DC transformer 2 adopts an AHB transformer, the switching frequency of the backup boost transformer 4 is 300 kHz, the magnetic core of the inductor L2 is RM6, the capacitor C2 is 10 micro farads, and the controller is UCC3813, which is manufactured by Texas Instruments. The measured wave patterns are shown in FIG. 7. As can be seen from the figure, the sustaining time is 28.8 ms. During the sustaining time, the first DC voltage $V_1$ drops from 400V to 220V ($V_{low}$), but the second DC voltage $V_2$ of the AHB transformer 2 only drops from 400V to 370V.

Through design of the sustaining time, the present invention has the following effects.

1. The capacity of the storage capacitor of the PFC transformer can be fully utilized to have a longer sustaining time and decrease the capacity of the storage capacitor.
2. The efficiency of the transformer can be enhanced to increase the power density thereof.
3. There is no detrimental influence to the performance of the FE DC transformer.
4. This design can apply to FE DC transformers belong to various kinds of circuit topologies.

To sum up, the present invention has the following characteristics.

A. The capacity of the storage capacitor of the PFC transformer can be fully utilized to have a long sustaining time and decrease the capacity of the storage capacitor.
B. The FE DC transformer operates at a larger duty ratio to decrease the normal rated voltage of the rectifier so as to increase the efficiency and power density.
C. Because the backup boost transformer has a short sustaining time, it can be configured for high frequency and high power density. The backup boost transformer can also have a very small volume. Moreover, the backup boost transformer may be protected from over currents or voltages during this process.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A distributed power system comprising:
   a power factor correction transformer for transforming an AC input voltage into a first DC voltage;
   a front end DC transformer; and
   a backup boost transformer being placed between an output terminal of the power factor correction transformer and an input terminal of the front end DC transformer, being parallel connected with a diode, and only operating in a sustaining time;
   wherein the backup boost transformer levels up the gradually dropping first DC voltage to a second DC voltage during the sustaining time, and the front end DC transformer transforms the second DC voltage to a third DC voltage, the backup boost transformer stopping operation when the first DC voltage lies out of a range between a first preset voltage and a second preset voltage, the first preset voltage and the second preset voltage being regular output voltages of the power factor correction transformer and the backup boost transformer respectively.

2. The distributed power system as claimed in claim 1, wherein the front end DC transformer is with an asymmetric half bridge topology.

3. The distributed power system as claimed in claim 1, wherein the backup boost transformer further comprises:
   a boost transformer topology having an input terminal connected to the output terminal of the power factor correction transformer, an output terminal connected to the input terminal of the front end DC transformer, and a control terminal;
   a hysteresis comparator being connected to the output terminal of the power factor correction transformer for stopping the operation of the backup boost transformer if the first DC voltage lies out of the range between the first preset voltage and the second preset voltage; and
   a controller connected to an output terminal of the hysteresis comparator and the control terminal of the boost transformer topology for controlling a duty ratio of the boost transformer topology.

4. The distributed power system as claimed in claim 1, wherein the boost transformer topology further comprises a MOS, an inductor, a diode, and a capacitor, the MOS has a source grounded, a drain connected to one end of the inductor and the diode, and a gate connected to the output terminal of the controller, the other end of the inductor is connected to the output terminal of the power factor correction transformer, the other end of the diode is connected to one end of the capacitor and the input terminal of the front end DC transformer, and the other end of said capacitor is grounded.

5. The distributed power system as claimed in claim 3, wherein the hysteresis comparator comprises a comparison circuit and a reference voltage.

6. A distributed power system having a power factor correction transformer, a front end DC transformer, and a backup boost transformer connected between the power factor correction transformer and the front end DC transformer and parallel connected with a diode, the backup boost transformer comprises:
   a boost transformer topology having an input terminal connected to an output terminal of the power factor correction transformer, an output terminal connected to an input terminal of the front end DC transformer, and a control terminal;
   a hysteresis comparator being connected to the output terminal of the power factor correction transformer for stopping the backup boots transformer from operation, when an output voltage of the power factor correction transformer lies out of a range between a first preset output voltage thereof and a second preset voltage, wherein the first and the second preset voltage are regular voltages of the power factor correction transformer and the backup boost transformer respectively; and
   a controller being connected to the output terminal of the hysteresis comparator and the control terminal of the boots transformer topology for controlling a duty ratio of the boots transformer topology.

7. The distributed power system as claimed in claim 6, wherein the boots transformer topology comprises a MOS, an inductor, a diode, and a capacitor, the MOS has a source grounded, a drain connected to one end of the inductor and the diode, and a gate connected to the output terminal of the controller, the other end of the inductor is connected to the output terminal of said power factor correction transformer, the other end of said diode is connected to one end of the capacitor and the input terminal of the front end DC transformer, and the other end of the capacitor is grounded.

8. The distributed power system as claimed in claim 6, wherein the hysteresis comparator comprises a comparison circuit and a reference voltage.

\* \* \* \* \*